United States Patent
Levan

(10) Patent No.: US 7,100,539 B2
(45) Date of Patent: Sep. 5, 2006

(54) SIMULATIVE ANIMAL TOY FOR TRAINING AND EXERCISE

(76) Inventor: Michele Levan, 321 S. 22nd St., 3rd Floor, Philadelphia, PA (US) 19103

( * ) Notice: Subject to any disclaimer, the term of this patent is extended or adjusted under 35 U.S.C. 154(b) by 0 days.

(21) Appl. No.: 10/854,301

(22) Filed: May 27, 2004

(65) Prior Publication Data

US 2005/0028754 A1 Feb. 10, 2005

Related U.S. Application Data

(60) Provisional application No. 60/491,966, filed on Aug. 4, 2003.

(51) Int. Cl.
*A01K 29/00* (2006.01)

(52) U.S. Cl. .................. 119/707; 472/70; D24/195; D30/160

(58) Field of Classification Search ............... 119/702, 119/707, 709, 710, 711; 472/70, 133; 446/27; 602/234; D24/195; 606/234; D30/160
See application file for complete search history.

(56) References Cited

U.S. PATENT DOCUMENTS

| | | | | |
|---|---|---|---|---|
| 2,610,851 A | * | 9/1952 | Jones | ............ 119/710 |
| 3,439,447 A | * | 4/1969 | Green | ............ 446/27 |
| D269,462 S | * | 6/1983 | Qually | ............ D24/195 |
| D276,939 S | * | 12/1984 | Pascoe | ............ D24/194 |
| 4,544,361 A | * | 10/1985 | Van Veen et al. | ............ 434/296 |
| 4,778,172 A | * | 10/1988 | Bryan | ............ 472/70 |
| 5,318,590 A | * | 6/1994 | Brennan et al. | ............ 606/234 |
| 5,560,320 A | | 10/1996 | Plunk | ............ 111/709 |
| 6,076,829 A | | 6/2000 | Oblack | ............ 273/317 |
| 6,695,673 B1 | * | 2/2004 | Stadbauer | ............ 446/305 |
| 2002/0017759 A1 | * | 2/2002 | McClung, III et al. | ..... 273/317 |
| 2004/0006291 A1 | * | 1/2004 | Rehrig | ............ 601/70 |

FOREIGN PATENT DOCUMENTS

DE    004315124 A1 * 11/1994

OTHER PUBLICATIONS

Dogtoys.com, "Lips for Dogs", http://dogtoys.com/fatcat.html, Aug. 4, 2003.

* cited by examiner

*Primary Examiner*—Robert P. Swiatek
(74) *Attorney, Agent, or Firm*—Albert T. Keyack

(57) ABSTRACT

A novelty dog toy includes an elongated substantially flat surface portion having a first end and a second end and a substantially spherical portion disposed at the first end of the elongated substantially flat surface portion. The substantially spherical portion is modeled after a dog fetch ball and rests comfortably in a dog's mouth. The elongated portion is shaped, textured, and colored to resemble an oversized human or animal tongue, such that it provides a novel and comical appearance to a pet when the pet holds the spherical portion in his mouth.

22 Claims, 10 Drawing Sheets

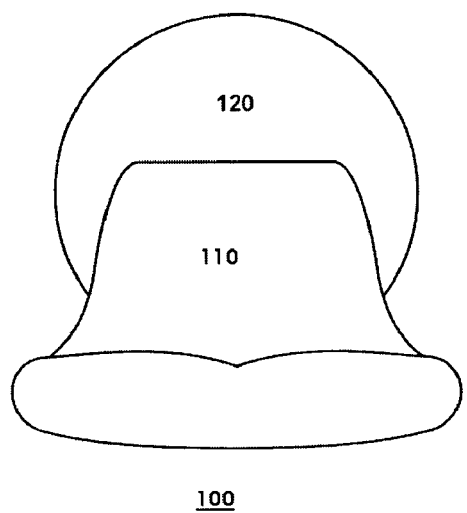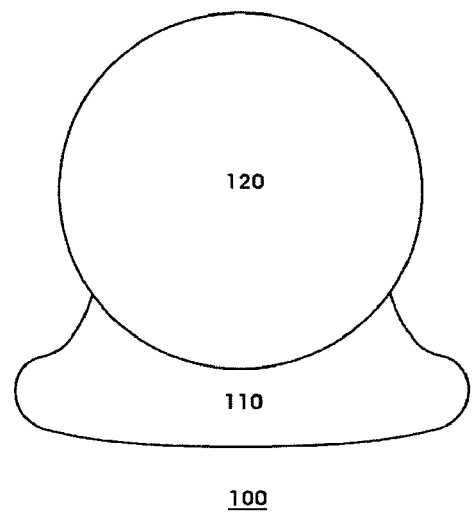
Figure 6                          Figure 7

SIMULATIVE ANIMAL TOY FOR TRAINING AND EXERCISE

CROSS-REFERENCE TO RELATED APPLICATIONS

The present application claims priority from Provisional U.S. patent application No. 60/491,966 filed on Aug. 4, 2003, and incorporated herein by reference.

The present application is also related to U.S. Pat. application Ser. No. 09/586,312, entitled MOOD COLLAR FOR PETS; filed Jun. 20, 2000, now U.S. Pat. No. 6,675,744 and incorporated herein by reference.

FIELD OF THE INVENTION

The present invention relates to a novel dog toy for dogs. In particular the present invention is directed toward a novelty dog fetch and/or chew toy having an appendage shaped like an oversized tongue such that when a dog holds the toy in his mouth, it presents a humorous appearance of an outlandishly sized tongue protruding from the dog's mouth.

BACKGROUND OF THE INVENTION

Pets bring a lot of enjoyment to a family. In many ways, they become an actual member of the family unit. It is widely believed that having a pet enhances the health of members of a family, and perhaps no pet is more widely regarded than the pet dog. Dogs are renown for their love, affection, and loyalty toward their masters. Therefore, keeping a family dog healthy is an important consideration.

Important to a dog's health, in addition to things such as proper nourishment and veterinary care, is the dog's psychological well being. For this reason, playing with a dog is very important to show that the dog is loved and to maintain his psychological health. In addition, the exercise achieved by this play will also help maintain a dog's physical health. Numerous dog toys have been introduced into the market to aid a person in playing with his dog, and perhaps one of the most beloved games of a dog is to play "fetch."

To this end, various fetch toys have been developed and marketed for use in playing with a pet dog. Moreover, the farther a fetch toy travels, the more and longer enjoyment that both the master and the dog get out of the toy. Furthermore, both dogs and humans enjoy dogs that have outrageous and fun appearances. The human is amused by the dog playing with the humorous toy and shows it by laughing and smiling. This response makes the dog even more delighted because he sees that he has pleased his master. The dog ultimately gets more enjoyment form the outrageous, funny toy.

Oblack, U.S. Pat. No. 6,076,829, issued Jun. 20, 2000 and incorporated herein by reference, discloses a ball throwing apparatus and method. Oblack's device provides a shaft with a half-spherical structure at one end for holding a fetching ball. The shaft allows the user to play fetch with a dog without getting dog slobber on his hands.

Plunk, U.S. Pat. No. 5,560,320, issued Oct. 1, 1996 and incorporated herein by reference, discloses a play and chew toy for dogs. Plunk is representative of one of any number of rope-type chew and throwing toys. These toys may be thrown by the dog owner and retrieved by the dog, and may also be used as a chew toy for dogs. When retrieving items thrown by an owner, many dogs enjoy bringing these toys back in their mouths (retrieving instincts) and often like to hold such items in their mouth for a prolonged period of time (hunting instincts).

Dogtoys.com (www.dogtoys.com/fatcat.html) sells a number of dog toys including fetch toys. Included among these toys is the LIPS FOR DOGS toy. According to the website, the owner can teach a dog to carry the novelty lips around in the dog's mouth so as to provide a comical appearance. However, it does not appear that the toy is intended for the game of fetch, due to the awkwardly large size of the toy, nor does it appear to be readily adaptable to fetch, as the shape does not lend itself to throwing (like a stick) or rolling or bouncing (like a ball). The portion of the apparatus that is intended for the dog to hold in its mouth is a very short "stub" which barely protrudes behind the "lips" of the device, and thus is not conducive to a dog picking it up nor conducive to a dog holding it in its mouth for any period of time.

Novelty items for pets have become popular. Owners like to dress up their pets in costumes, as also provide their pets with various accessory items. Many pet owners believe that the pet enjoys such accessories as much as the owner, as they are an indication of the attention lavished on the pet. The present inventor, in addition to the present invention, has developed and patented the MOODY DOG™ pet mood collar, (U.S. Pat. No. 6,675,744, noted above) which incorporates mood ring elements into a pet collar.

However, there heretofore has not been developed a chew or throw toy for dogs that incorporates such novelty elements in a form that also may be used as a fetching or chewing toy.

SUMMARY OF THE INVENTION

It is one object of the present invention to provide a dog toy that has an outrageous, entertaining, and humorous appearance, while simultaneously being able to travel a great distance when thrown in a game of "fetch" with a dog.

In accordance with an aspect of the present invention, there is provided a novel dog toy. The dog toy has an enlongated substantially flat surfaced portion having a first end and a second end and a substantially spherical portion disposed at the first end of the elongated substantially flat surfaced portion. The elongated substantially flat surfaced portion is shaped and colored to look like an oversized tongue. Thus, when a dog naturally picks up the spherical portion in his mouth, the spherical portion disappears from sight, and the elongated substantially flat surface provides the appearance of a cartoon-like oversized tongue hanging from the dog's mouth. The appearance is both astonishing and humorous.

BRIEF DESCRIPTION OF THE DRAWINGS

The foregoing summary, as well as the following detailed description of a preferred embodiment of the present invention will be better understood when read with reference to the appended drawings, wherein:

FIG. 6 is a front view of the dog toy of the preferred embodiment of the present invention.

FIG. 7 is a rear view of the dog toy of the preferred embodiment of the present invention.

DETAILED DESCRIPTION OF THE INVENTION

Figure 1:
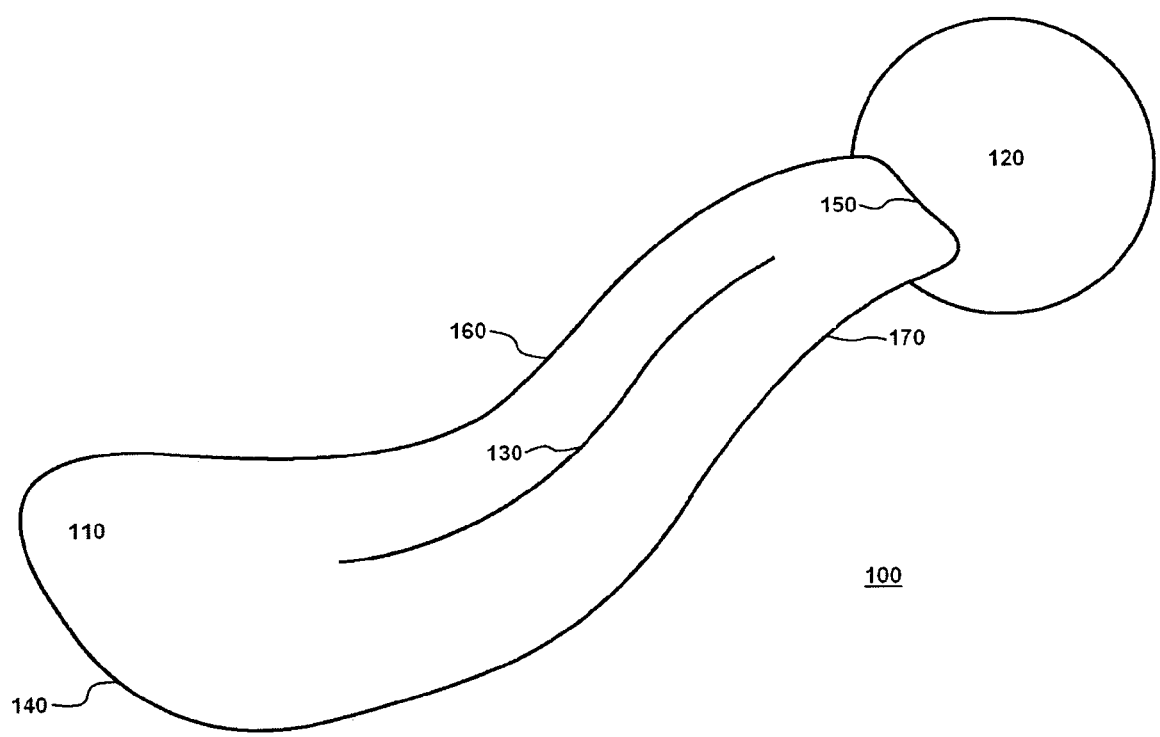
FIG. 1 is a perspective view of the dog toy of the preferred embodiment of the present invention.

FIG. 1 is a perspective view of the dog toy 100 of the preferred embodiment of the present invention. Dog toy 100 includes an elongated substantially flat surfaced portion 110 and a substantially spherical portion 120. Elongated substantially flat surfaced portion 110 comprises a first end 140 and a second end 150. The substantially spherical portion 120 is disposed at second end 150 of elongated substantially flat surfaced portion 110 such that elongated substantially flat surfaced portion 110 extends generally radially outward from substantially spherical portion 120.

In use, substantially spherical portion 120 of dog toy 100 may be either placed in the mouth of a dog, or the dog may pick it up himself, in order to give the appearance of the dog having a very large cartoon-like tongue, generating enjoyment for the dog owner, onlookers, and due to all this attention from humans, even the dog is further amused and engaged. This configuration also allows for the dog toy 100 to travel farther when thrown by a human when grasping the first end 140 of the elongated substantially flat surfaced portion 110 of the dog toy 100. Moreover, a human may be able to grasp and throw dog toy 100 by grasping the first end 140 without getting slobber or the like on the user's hands.

In a preferred embodiment of the present invention, dog toy 100 may be injection molded from natural rubber. Additionally, the elongated substantially flat surfaced portion 110 and the substantially spherical portion 120 may be formed as one integral unit of dog toy 100. However, other materials known to one of ordinary skill in the art may be used in the place of rubber to form the dog toy 100.

For example, the apparatus of the present invention may also be made in an edible version, formed of such materials as a red colored rawhide, red cornstarch, red dog treat material, or the like (e.g., MILKBONE™ dog biscuit material). In such an embodiment, the apparatus of the present invention may be used as a dog treat or chew, that a dog may consume as well as play with.

In another embodiment, the apparatus of the present invention may be made of a glow-in-the-dark elastomeric material such that the tongue will glow in the dark, for example, if a dog is being walked at night. Alternately, an LED (Light Emitting Diode) battery-operated version may be made with embedded LEDs, which may illuminate continuously or flash. Any type of illumination process may be applied to the present invention. In addition to amusement, such an embodiment makes the device easier to retrieve at night and also provides additional safety for the dog and human when walking at night.

Figure 2:
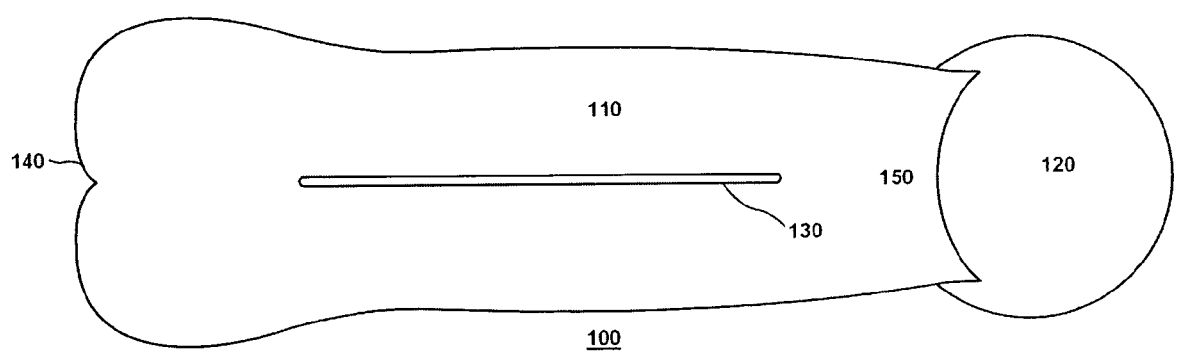
FIG. 2 is a top view of the dog toy of the preferred embodiment of the present invention.
Figure 8:
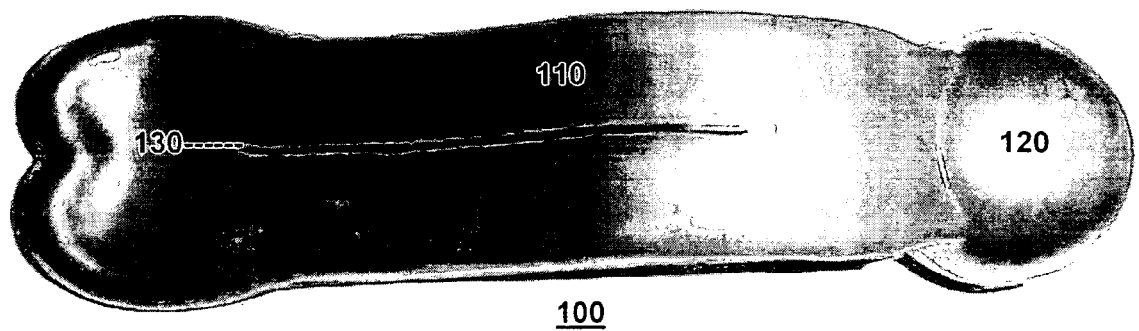
FIG. 8 is a top view of the preferred embodiment of the present invention.

FIG. 2 is a top view of the dog toy of the preferred embodiment of the present invention. FIG. 8 is a top view of the preferred embodiment of the present invention. Referring to FIGS. 1, and 8, dog toy 100 is provided with two main portions, a tongue portion 110, and a spherical portion 120. As noted above, dog toy 100 may be manufactured from molded natural rubber in a preferred embodiment.

However, other types of materials may be used within the spirit and scope of the present invention. Such materials include, but are not limited to, artificial rubbers such as urethane and polyurethane, and the like, latex, tennis ball material, canvas, vinyl, stuffed latex, stuffed plush material (i.e., stuffed with beads, Styrofoam, filler, or the like), fleece or other woolly material, or the like. In addition, flavored or scented materials may be used, as well as food products such as rawhide, dried dog food, or the like. In the preferred embodiment, as presently marketed, a natural rubber is used as this provides a realistic tongue-like appearance. In the preferred embodiment, the apparatus may be red in color.

Tongue portion 110 may be shaped, textured, and colored to look like a human or animal tongue. A central indent 130 may be provided, colored in a darker color than the surrounding material (e.g., black) to complete the illusion of an unusually large tongue. Spherical portion 120 may be similar in shape and size to known dog throwing balls and the like, and may be hollow inside. In the hollow inner portion, a bell, squeaker, or other noise making device, or an electronic music, sound, or recorded voice chip may be inserted, although not in the preferred embodiment. In an alternative embodiment, a dog treat, or other consumable, or flavoring or scenting agent may be placed in the hollow portion.

Figure 3:
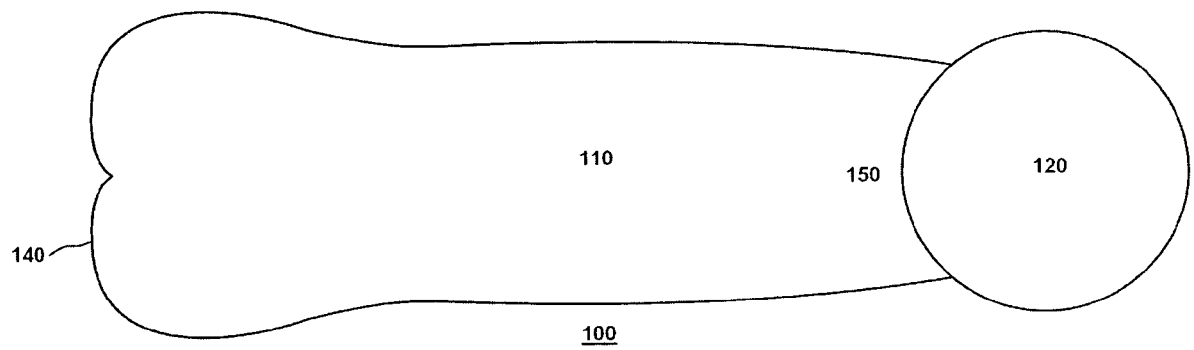
FIG. 3 is a bottom view of the dog toy of the preferred embodiment of the present invention.
Figure 9:
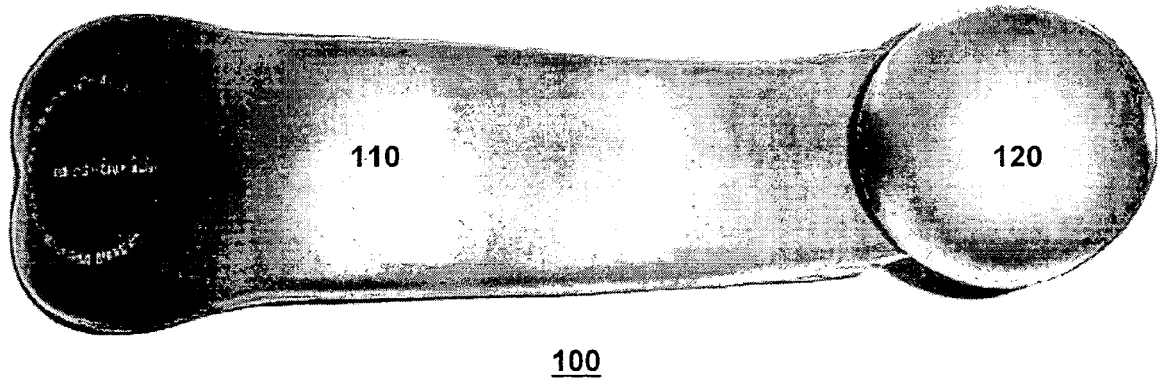
FIG. 9 is a bottom view of the preferred embodiment of the present invention.

FIG. 3 is a bottom view of the dog toy of the preferred embodiment of the present invention. FIG. 9 is a bottom view of the preferred embodiment of the present invention. Referring to FIGS. 3 and 9, note that in the preferred embodiment, the bottom side of tongue portion 110 is relatively unadorned and has a substantially flat surface. At this portion is not generally visible in use, there may be no need for ornamentation on this surface.

However, in an alternative embodiment, this surface may also be shaped, textured, and colored to look like either the topside or underside of a human or animal tongue. Since a dog may place the apparatus 100 in his mouth in an upside-down position (the dog not knowing any better) it may be advantageous to have both sides shaped and textured to look like a large tongue, so that the novelty appearance will be achieved no matter how the dog places the apparatus in his mouth.

Figure 4:
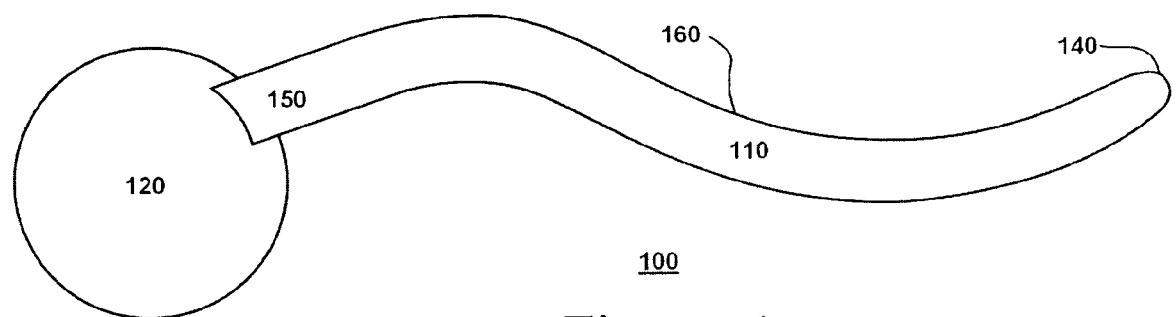
FIG. 4 is a left side view of the dog toy of the preferred embodiment of the present invention.
Figure 5:
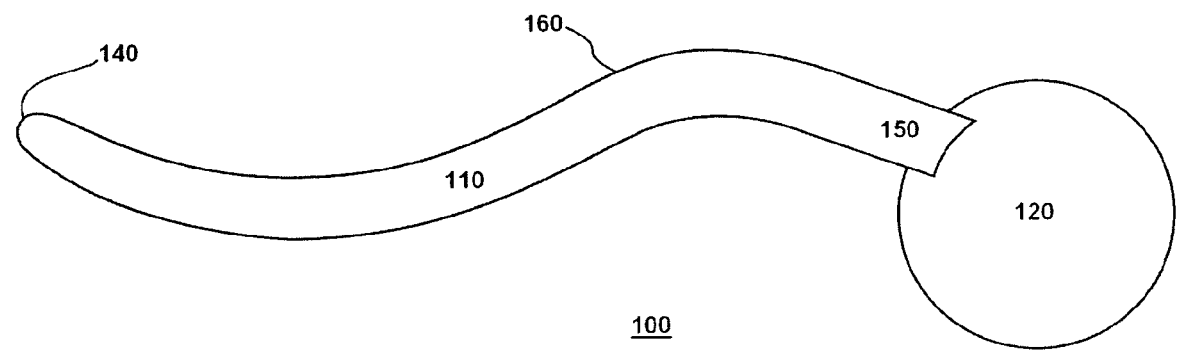
FIG. 5 is a right side view of the dog toy of the preferred embodiment of the present invention.
Figure 10:
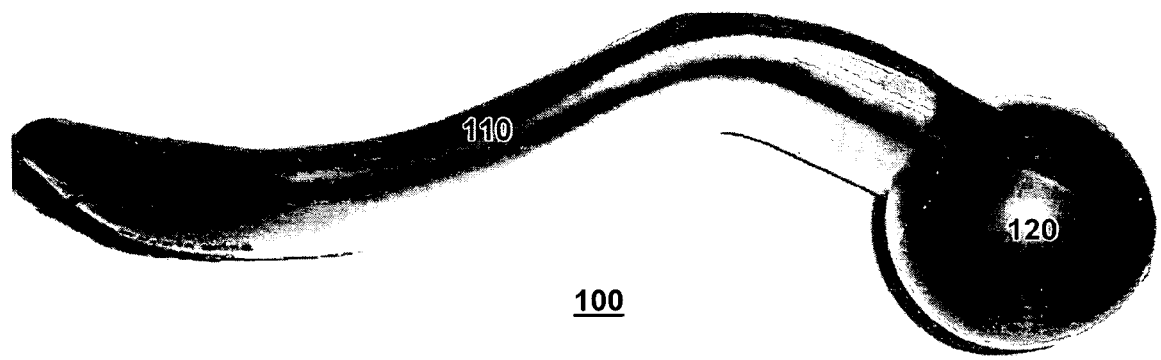
FIG. 10 is a side view of the preferred embodiment of the present invention.

FIG. 4 is a left side view of the dog toy of the preferred embodiment of the present invention. FIG. 5 is a right side view of the dog toy of the preferred embodiment of the present invention. FIG. 10 is a side view of the preferred embodiment of the present invention. Referring to FIGS. 4, 5, and 10, elongated substantially flat surface portion 110 may include a first curved section 160 and a second curved section 170, such that elongated substantially flat surface portion 110 resembles a large human or animal tongue. In a preferred embodiment, the elongated substantially flat surface portion 110 of the dog toy 100 may be approximately nine inches in length. However, other lengths known to one of ordinary skill in the art may be used. In the preferred embodiment, there exists three sizes so as to fit every sized dog (large, medium, and small), offered as "original" HUMUNGA TONGUE™, "Junior" HUMUNGA TONGUE™ and "mini" HUMUNGA TONGUE™. All are available on the inventor's website at www.moodypet.com or at various pet stores and pet store chains.

Figure 11:
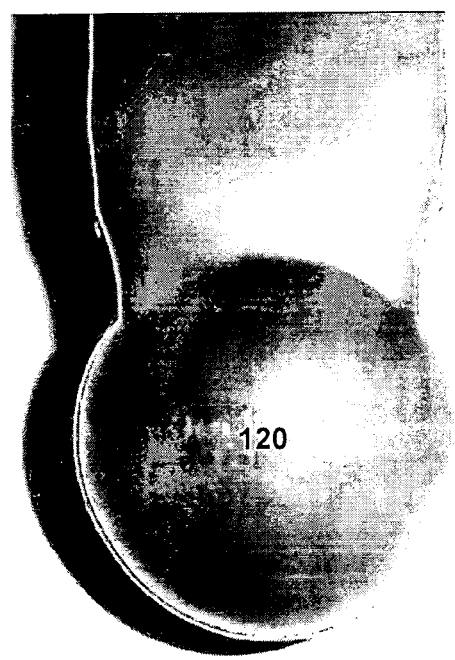
FIG. 11 is an enlarged bottom view of the spherical portion of FIG. 9.

FIG. 6 is a front view of the dog toy of the preferred embodiment of the present invention. FIG. 7 is a rear view of the dog toy of the preferred embodiment of the present invention. FIG. 11 is an enlarged bottom view of the spherical portion 120 of FIG. 9. The substantially spherical portion 120 is sized such that it may fit in the mouth of a dog. For example, in a preferred embodiment of the present invention, the substantially spherical portion 120 may be substantially two and three-quarters inches in diameter. However, any diameter known to one of ordinary skill in the art may be used. In the preferred embodiment, the diameter may be in the range of one and one-quarter inches to three inches in diameter for use with most dogs.

For example, for smaller dogs, a smaller spherical portion may be used so that the dog can get its muzzle around the spherical portion. While the spherical portion may be made smaller, proportional to the dog's size, the tongue portion will remain outsized in order to provide a comical and novelty appearance.

Figure 12:
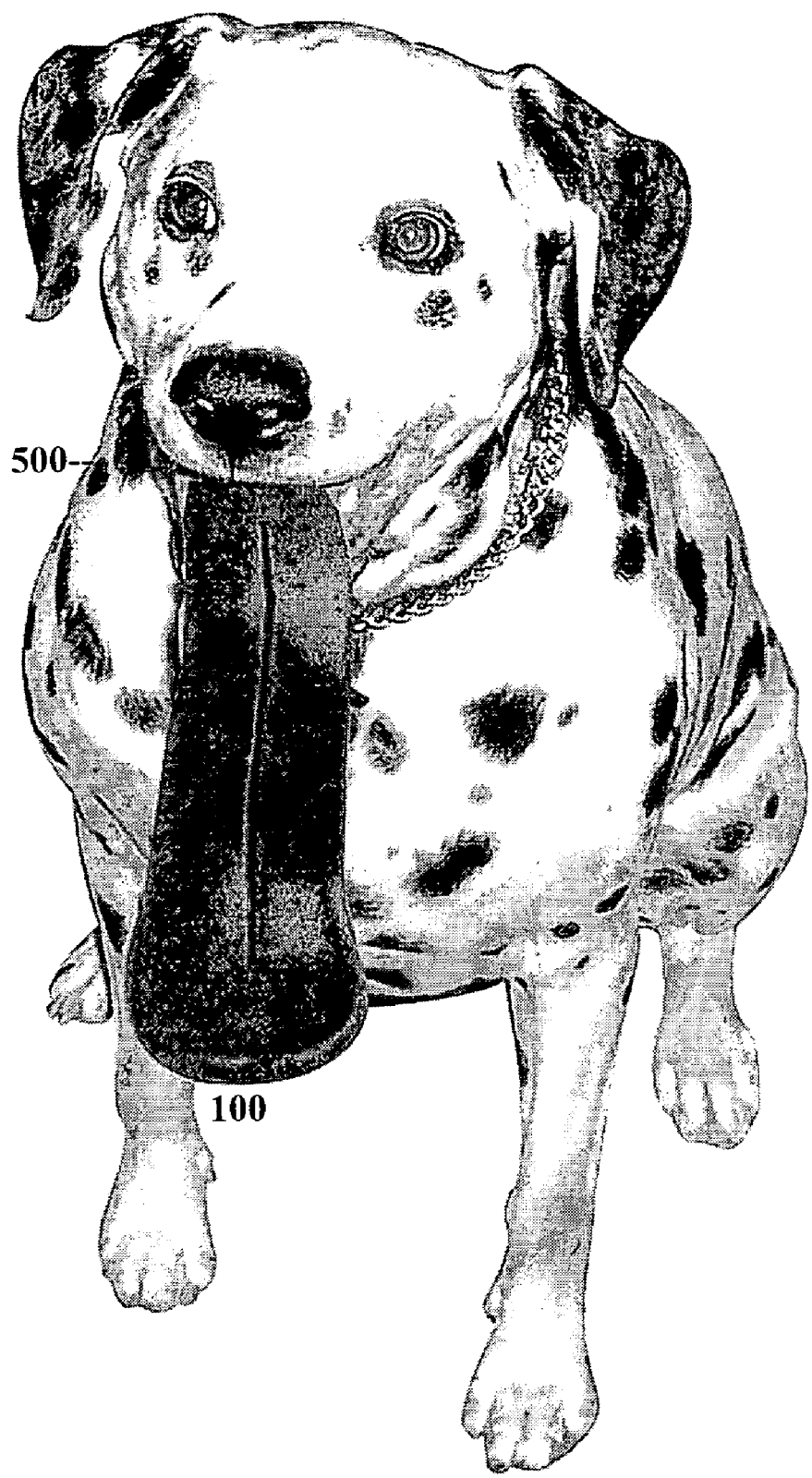
FIG. 12 is a view of the present invention in use, in a Dalmatian dog's mouth, illustrating the novel appearance of the present invention.
Figure 13:
FIG. 13 is another view of the present invention, in a Doberman dog's mouth, illustrating the novel appearance of the present invention.

FIG. 12 is a view of the present invention in use, in a Dalmatian dog's mouth, illustrating the novel appearance of the present invention. FIG. 13 is another view of the present invention, in a Doberman dog's mouth, illustrating the novel appearance of the present invention. In these two Figures, it is clearly illustrated how the present invention provides a comical and shocking appearance of a dog, which is sure to elicit a positive response from passersby and onlookers as well as amuse the pet owner. Note how the dogs appear to enjoy holding the dog toy of the present invention in their mouths. They, too, get more enjoyment from this toy over other toys.

Figure 14:
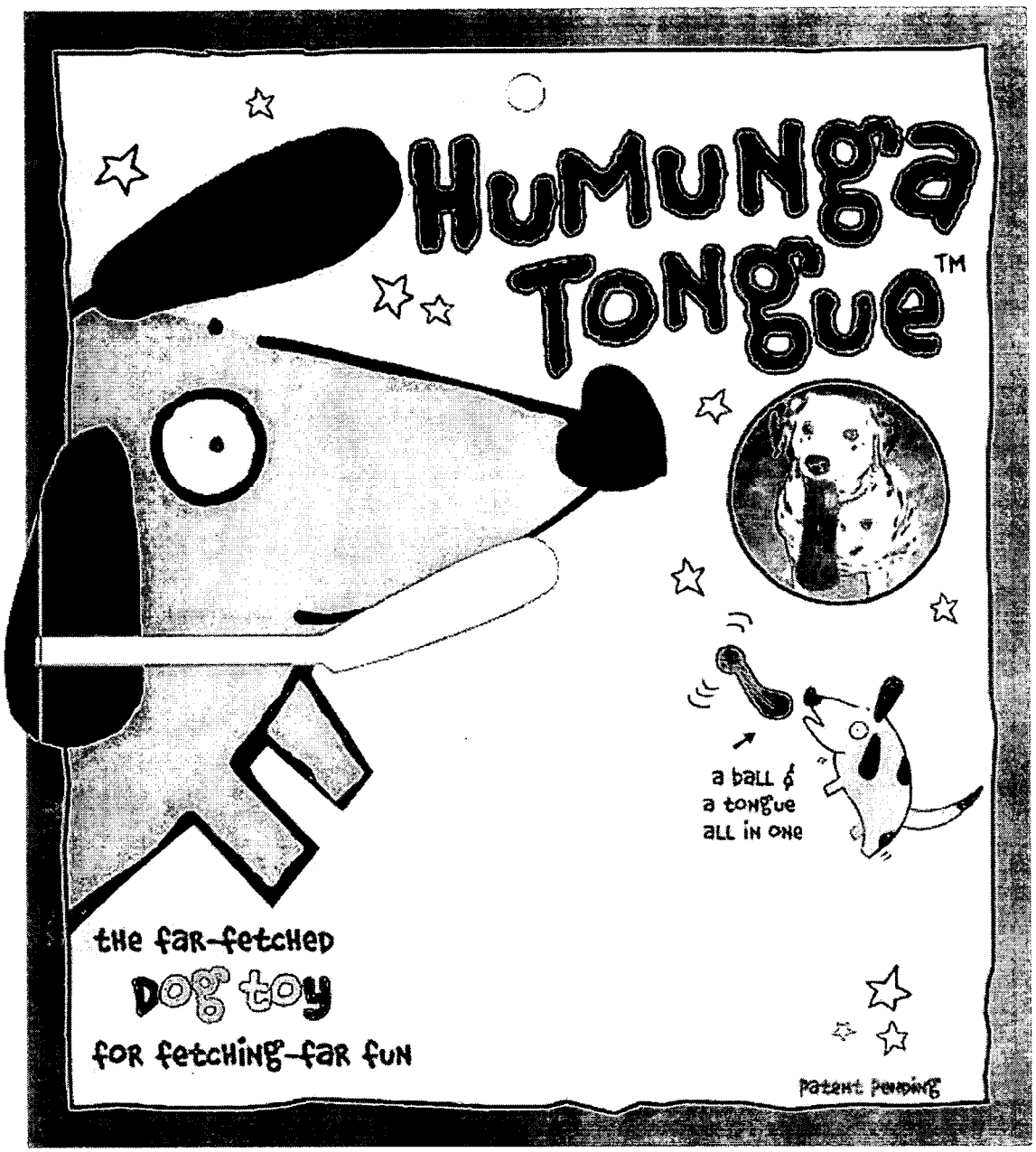
FIG. 14 is a front view of packaging of the present invention.
Figure 15:
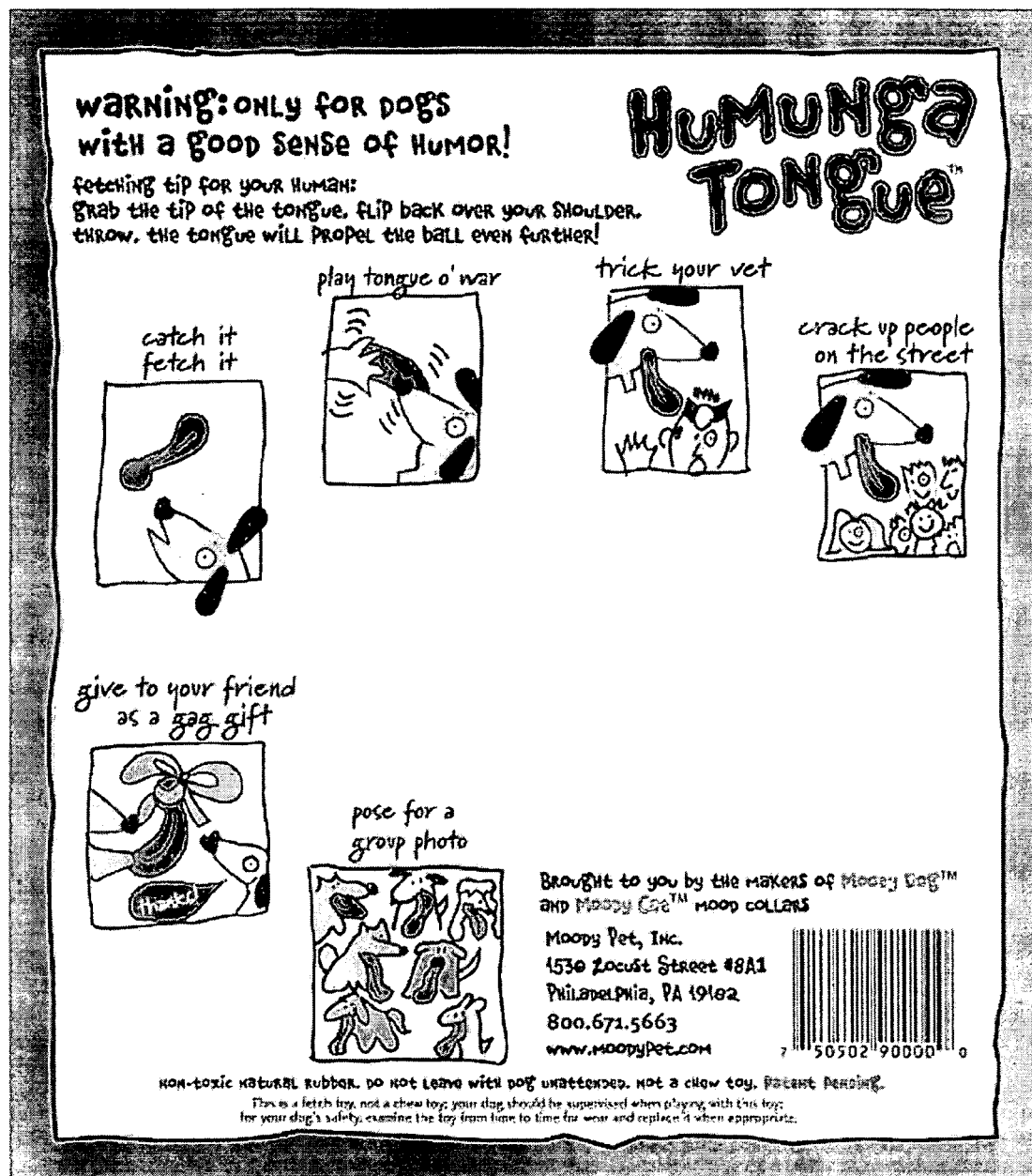
FIG. 15 is a rear view of packaging of the present invention.

FIG. 14 is a front view of packaging of the present invention. FIG. 15 is a rear view of packaging of the present invention. These two Figures illustrate how the invention is packaged for retail sale, with suggestions and instructions for use. Note that the name HUMUNGA TONGUE™ is a trademark of MOODYPET, INC. Note also that the contents of FIGS. 14 and 15 are Copyright© 2003, MOODYPET, INC.

In view of the foregoing disclosure, some of the advantages of the present invention can be seen. For instance, a novel dog toy that has a substantially spherical portion connected to an elongated substantially flat surface portion resembling a large tongue is disclosed. The dog toy can be tossed great distances to play fetch with a dog, as well as provide entertainment for both the dog and owners.

Unlike other novelty items, such as the dogtoys.com LIPS FOR DOGS discussed above, the present invention, with the elongated tongue, is more readily adaptable to be thrown long distances. In use, the user can grasp the tongue end and throw the apparatus end over end. In addition, the long shape of the present invention may appear to a dog as similar to traditional bone-shaped chew toys, and thus the dog may be more likely to pick up and chew on the device, as opposed to odd-shaped novelty items that a dog may not recognize as a chew toy.

While the preferred embodiment and various alternative embodiments of the invention have been disclosed and described in detail herein, it may be apparent to those skilled in the art that various changes in form and detail may be made therein without departing from the spirit and scope thereof.

For example, in the preferred embodiment of the present invention, a red, oversided animal tongue is disclosed. However, other tongue colors could be used such as black (Chow Chow tongue). In addition, other types of tongue designs could be used, such as reptile or lizard (e.g., forked) or the like. In addition, while illustrated herein as a dog toy, the present invention could also be used by humans (suitably modified by reducing the size of the spherical portion) as a costume or gag article.

Moreover, the present invention could be used with other types of pet and animals besides dogs (e.g., cats or the like or even horses and other animals). In addition, the present invention, in the preferred embodiment or suitably modified, could also be used by humans as a costume accessory or the like.

In addition, a version may be offered with "teeth" or other items (lips or the like) placed around the tongue to provide a more realistic or humorous effect. Various teeth designs may be used, including canine, human, vampire, "hillbilly" (missing, discolored, and/or deformed), or the like. Similarly, various lip designs may be used to provide different appearances.

Moreover, it should be noted that while the apparatus of the present invention is described as having a "substantially spherical portion" that is primarily designed to fit in the dog's mouth, this "substantially spherical portion" may take on other shapes without departing from the spirit and scope of the present invention. For example, a multi-sided surface such as a tetrahedron or the like may be used. Alternately, an oblong or egg-shaped portion may be used. The main limitation is that the portion designed to fit in the dog's mouth (or other animal mouth) should be shaped and sized so that it is a comfortable and natural fit for the animal's mouth and thus the animal will be comfortable holding the apparatus in it's mouth. In the preferred embodiment, a spherical shape is used, as dogs are accustomed to fetching and holding rubber balls and the like in their mouths. However, other shapes may be used without departing from the spirit and scope of the present invention.

I claim:

1. A toy for an animal, comprising: a unitary molded article comprising an elongated substantially flat surface portion having a thickness substantially less than its width, and a length defined between a first end and a second end, the elongated substantially flat surface portion being shaped to resemble an oversized mammal tongue that extends substantially uninterrupted over the length along a curved longitudinal axis which comprises a compound curve having a first curved section curved along the longitudinal axis and a second curved section curved along the longitudinal axis in the opposite direction, both the first and second curved sections being within the place of the flat surface portion simulating curved portions of a mammal tongue and that is directly joined to a substantially spherical portion disposed at the first end of the elongated substantially flat surface portion, the spherical portion for gripping in an animal's mouth such that when the spherical portion is gripped in an animal's mouth the elongated substantially flat surface portion extends from the animal's mouth so as to provide the appearance of an oversized mammal tongue extending from the animal's mouth.

2. The toy of claim 1, wherein the substantially spherical portion is approximately one and one-quarter to three inches in diameter and the length is proportionately between about five to nine inches.

3. The toy of claim 1, wherein at least one of the elongated substantially flat surface portion and the substantially spherical portion are formed of at least one of natural rubber, elastomeric rubber, an edible material, artificial rubbers, urethane, polyurethane, latex, tennis ball material, canvas, vinyl, stuffed latex, stuffed plush material stuffed with at least one of beads, expanded polystyrene, and filler, fleece, wool, flavored material, scented material, flood products, rawhide, and dried dog food.

4. The toy of claim 1, wherein at least one of the elongated substantially flat surface portion and the substantially spherical portion are illuminated by at least one of forming of at least one of the elongated substantially flat surface portion and the substantially spherical portion of a glow-in-the-dark elastomeric material such that the tongue will glow in the dark.

5. The toy of claim 1, wherein the elongated substantially flat surface portion has a proximal end and a distal end, and said distal end comprises a bulbous portion that is wider than an immediately adjacent portion.

6. A dog toy, consisting essentially of: a unitary molded article comprising a first substantially spherical portion shaped to fit within a dog's mouth, and a second portion, connected directly to and extending substantially uninterrupted along a longitudinal axis which comprises a compound curve having a first curved section curved along the longitudinal axis and a second curved section curved along the longitudinal axis in the opposite direction, both the first and second curved sections being within the plane of the flat surface portion extending from the first portion, the second portion being wider than it is thick and being shaped to include a wider portion at a distal end and colored to resemble an oversized tongue, wherein when the first portion is placed in a dog's mouth, the second portion extends from the dog's mouth providing the appearance that an unusually oversized tongue is extending from the dog's mouth due to the curved sections of the longitudinal axis and wider distal end.

7. The dog toy of claim 6, wherein the first portion and second portion are formed of an elastomeric material.

8. The dog toy of claim 6, wherein the first portion and second portion are formed of natural rubber.

9. The dog toy of claim 6, wherein the first portion and second portion are formed of an edible material.

10. The dog toy of claim 6, wherein the second portion is provided with an axial groove colored to resemble a groove in an animal tongue.

11. The dog toy of claim 6, wherein the first portion is a substantially spherical portion substantially one and one-quarter to three inches in diameter.

12. The dog toy of claim 6, wherein at least one of the first portion and the second portion are formed of at least one of: natural rubber, elastomeric rubber, an edible material, artificial rubbers, urethane, polyurethane, latex, tennis ball material, canvas, vinyl, stuffed latex, stuffed plush material stuffed with at least one of beads, expanded polystyrene and filler, fleece, wood, flavored material, scented material, food products, rawhide, and dried dog food.

13. The dog toy of claim 6, wherein at least one of the first portion and the second portion are illuminated by at least one of forming of at least one of the first portion and the second portion of a glow-in-the dark elastomeric material such that the tongue will glow in the dark.

14. The dog toy of claim 6, wherein the second portion has a proximal end and a distal end, and said distal end comprises a bulbous portion that is wider than an immediately adjacent portion.

15. A animal toy for a dog, consisting essentially of: a unitary molded article comprising a first substantially spherical portion, and a second tongue-shaped portion that is wider than it is thick, extending substantially uninterrupted from the first portion along a curved longitudinal axis which comprises a compound curve having a first curved section curved along the longitudinal axis and a second curved section curved along the longitudinal axis in the opposite direction, both the first and second curved sections being within the plane of the flat surface portion, the second tongue-shaped portion shaped and colored to resemble an oversized animal tongue, wherein when the first portion is placed in an animal's mouth, the second tongue-shaped portion extends from the animal's mouth providing the appearance that an oversized animal tongue is extending from the animal's mouth due to the curved longitudinal axis.

16. The animal toy of claim 15, wherein at least one of the first portion and the second tongue-shaped portion are formed of at least one of: natural rubber, elastomeric rubber, an edible material, artificial rubbers, urethane, polyurethane, latex, tennis ball material, canvas, vinyl, stuffed latex, stuffed plush material stuffed with at least one of beads, expanded polystyrene, and filler, fleece, wool, flavored material, scented material, food products, rawhide, and dried dog food.

17. The animal toy of claim 15, wherein at least one of the first portion and the second tongue-shaped portion are illuminated by at least one of forming of at least one of the first substantially spherical portion and the second tongue-shaped portion of a glow-in-the dark elastomeric material such that the tongue will glow in the dark.

18. The animal toy of claim 15, wherein the second tongue-shaped portion is provided with an axial groove colored to resemble a groove in an animal tongue.

19. The animal toy of claim 15, wherein the first portion comprises a substantially spherical portion, substantially one and one-quarter to three inches in diameter.

20. The animal toy of claim 15, wherein the second tongue-shaped portion has a proximal end and distal end, and said distal end comprises a bulbous portion that is wider than an immediately adjacent portion.

21. A dog exercise and training device comprising a unitary molded article comprising a substantially spherical portion having a diameter and a tongue portion that is wider than it is thick connected to and extending along a longitudinal axis having a compound curve that extends from the spherical portion for a length between about three to four times the diameter, wherein when the spherical portion is in a dog's mouth, the tongue portion curves in a first direction and then a second opposite direction and thereby provides the appearance that an unusually oversized tongue is extending from the dog's mouth.

22. The dog exercise and training device of claim 21 wherein the substantially spherical portion is between one and one-quarter to three inches in diameter and the tongue portion extends from the spherical portion for a length between about five to nine inches.

* * * * *